United States Patent [19]
Fujita et al.

[11] 4,257,496
[45] Mar. 24, 1981

[54] DISC BRAKE OF HYDRAULICALLY OPERATED TYPE

[75] Inventors: Tomohiro Fujita, Hanyo; Kennosuke Iida, Iwatsuki; Kazuo Kawase, Kuki, all of Japan

[73] Assignee: Akebono Brake Industry Co., Ltd., Tokyo, Japan

[21] Appl. No.: 46,038

[22] Filed: Jun. 6, 1979

[30] Foreign Application Priority Data

Jun. 13, 1978 [JP] Japan .................................. 53-71040

[51] Int. Cl.³ .......................................... F16F 55/224
[52] U.S. Cl. .................................... 188/72.6; 188/344
[58] Field of Search ................... 188/72.1, 72.4, 72.6, 188/13.3, 344

[56] References Cited

U.S. PATENT DOCUMENTS

| | | | |
|---|---|---|---|
| 2,961,072 | 11/1960 | Nothstine | 188/72.6 |
| 3,435,922 | 4/1969 | Schmid | 188/72.6 X |
| 3,935,927 | 2/1976 | Haraikawa | 188/344 X |
| 4,032,200 | 6/1977 | Farr | 188/344 X |

*Primary Examiner*—Duane A. Reger
*Attorney, Agent, or Firm*—Toren, McGeady and Stanger

[57] ABSTRACT

A disc brake of a type incorporating therein a hydraulic pressure generator, the disc brake having a pair of friction pads disposed on both sides of a disc to be braked to confront each other across the disc; a guide shaft; and a caliper which is provided with a thrusting piston incorporated therein for pushing one of the friction pads against the disc with hydraulic pressure and is arranged to push the other friction pad against the disc as said caliper is moved on the guide shaft by a reaction to the thrusting action. The hydraulic pressure generator is disposed within the guide shaft and is provided with a cylinder which is formed within the guide shaft, a hydraulic pressure generating piston which slidably engages the cylinder and a hydraulic pressure generating chamber. The hydraulic pressure generating chamber communicates, through a passage means, with a hydraulic operation chamber which exerts hydraulic pressure on the thrusting piston. The hydraulic pressure generating piston is operated by an external force to raise hydraulic pressure within the hydraulic pressure generating chamber for performing a braking action by driving the thrusting piston with this hydraulic pressure.

5 Claims, 5 Drawing Figures

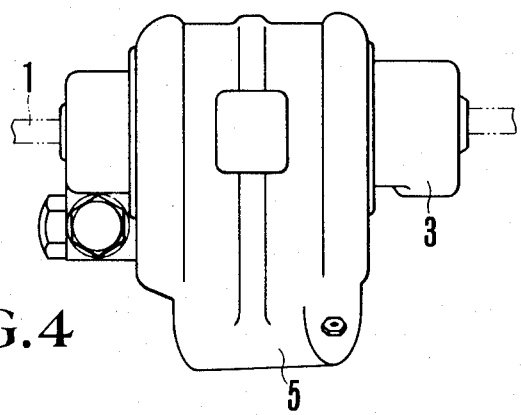
FIG.3
FIG.4
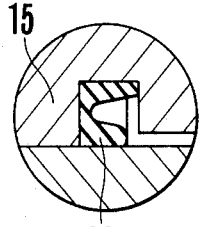
FIG.5
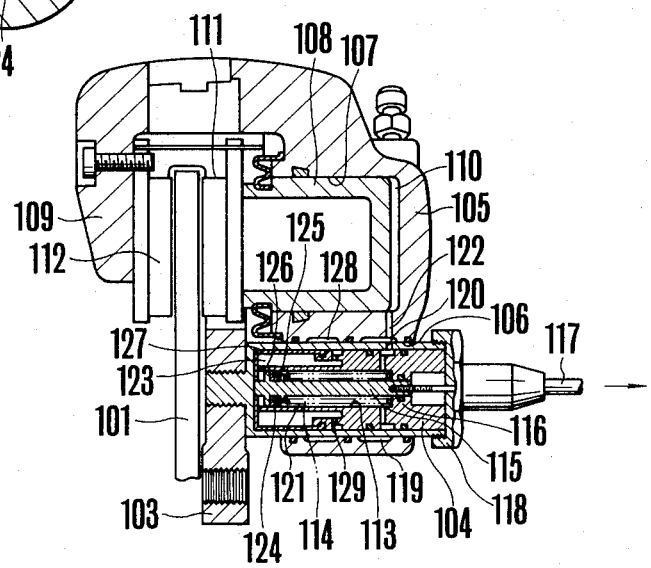

DISC BRAKE OF HYDRAULICALLY OPERATED TYPE

BACKGROUND OF THE INVENTION

1. Field of the Invention

This invention relates to an improvement in a hydraulically operated type disc brake.

2. Description of the Prior Art

Hydraulically operated type disc brakes in general are used in various manner for motor vehicles on account of their simple structure. The brake of this type is arranged to produce a hydraulic pressure within a master cylinder by applying an external force either to a brake lever or to a brake pedal and to transfer the hydraulic pressure to a brake device through a hydraulic transfer pipe line.

A brake of this type has a latent problem that a failure in the transfer of hydraulic pressure would lead to nullification of the brake. This problem is serious particularly in the case of an auto-bicycle or the like wherein the brake device is exposed to the outside, because the pipe line of the brake device tends to be damaged when it overturns. Therefore, this problem calls for a thorough attention to the prevention of such damage.

SUMMARY OF THE INVENTION

This is therefore the principal object of this invention to provide this type of a disc brake which solves the above stated problem.

Generally, a disc brake of this type comprises a disc rotor, a pair of friction pads which come to press the disc brake on both sides thereof when brake is applied; a hydraulic piston which thrust one of the friction pads against the disc rotor; a caliper which is arranged to be moved or swayed by a reaction to this thrust to push the other friction pad also against the disc rotor; and a support which is secured to a structural part of a vehicle to carry the caliper and to guide its movement or swaying action. In accordance with the present invention, the support which is a fixed part and a guide pin which is arranged to guide the caliper are used to have a hydraulic pressure generator arranged within them. This arrangement obviates the necessity of providing the independent hydraulic piping which has hitherto been necessary.

The above and other object and features of the invention will be apparent from the following description of embodiments thereof when read in connection with the accompanying drawings.

BRIEF DESCRIPTION OF THE DRAWINGS

Accompanying drawings show embodiments of this invention by way of example.

FIG. 3 is a front view showing the same embodiment.

FIG. 4 is an enlarged view showing a part of FIG. 1.

FIG. 5 is a partially sectional view showing a disc brake as a second example embodying the invention.

DETAILED DESCRIPTION OF PREFERRED EMBODIMENTS

Figure 1:
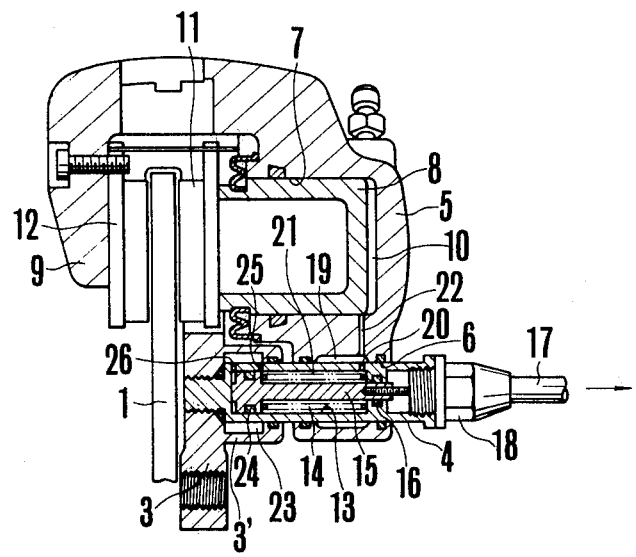
FIG. 1 is a partially sectional view showing a disc brake as a first example embodying the invention.

In FIG. 1 through FIG. 4 which show a first embodiment example of this invention, there is provided a disc 1 which is arranged to rotate together with a wheel; a fork 2 carries a front wheel; a support 3 is secured to the fork 2 and is disposed close to one side of the disc 1; and a guide pin 4 is secured to the support 3 and is arranged to extend in the axial direction of the disc. The guide pin 4 is fixed to the support 3 in a cantilever-like manner to extend in the direction opposite to the disc rotor 1. Further, there is provided another guide pin which is not shown but is arranged in a pair with the guide pin 4 is also secured to the support 3.

A caliper 5 is provided with an opening 6 which slidably engages the guide pin 4 to make the caliper 5 movable in the axial direction of the disc rotor 1. In one of the confronting parts of the caliper 5 arranged to straddle the edge portion of the disc rotor 1, there is provided a cylinder 7. A thrusting piston 8 is placed in the cylinder 7. The other of the confronting parts of the caliper 5 is arranged to be a reaction part 9. A reference numeral 10 indicates a hydraulic chamber; and 11 and 12 indicate friction pads disposed to confront each other across the disc rotor 1. The friction pad 11 which is disposed on the inner side is arranged to be pushed against the disc rotor by the thrusting piston 8. The other friction pad 12 which is disposed on the outer side is arranged to be pushed against the disc rotor 1 by the reaction part 9 of the caliper 5 as the caliper 5 moves being guided by the guide pin 4.

The arrangement described in the foregoing is identical with that of a conventionally known disc brake. The present invention, however, is characterized in that a hydraulic pressure generator is arranged to be incorporated in the inside of the disc brake by utilizing the support 3, one (4) of the guide pins and a part of the caliper arranged to be in slidable engagement with this guide pin 4.

In the axial core part of the guide pin 4, there is formed a cylinder 13. A hydraulic pressure generating piston 15 which is urged and biased in one direction by the force of a spring 14 is arranged to slidably engage this cylinder 13. A small diameter shaft part of the hydraulic pressure generating piston 15 penetrates a partition wall 16 of the cylinder 13 and the fore end thereof is connected to a brake cable 17.

A cap which serves a combined purpose of mounting the brake cable 17 is secured to the fore end of the guide pin 4. A numeral 19 indicates a circumferential groove formed in the opening part 6 of the caliper 5 and is arranged to always communicate with a hydraulic pressure generating chamber 21 of the hydraulic pressure generator through a flow path 20 formed in the guide pin 4. The groove 19 is also arranged to be always communicating, through a flow path 22 formed in the caliper 5, with the hydraulic chamber 10 of the cylinder 7 which has the thrusting piston 8 inserted therein.

A reservoir 23 is formed at a cylindrical wall 3' of the support 3 in a manner to surround the guide pin 4 at its root part at which it is fixed. The reservoir 23 is connected to a hydraulic oil passing port 25 which is arranged to be closed by a cup seal 24 when the piston 5 moves and a port 26 which is arranged to transfer the hydraulic oil from the reservoir 23 to the hydraulic pressure generating chamber 21 only at the time of releasing hydraulic pressure by a unidirectional sealing action which is arranged to take place by utilizing the elastic deformation of the cup seal 24.

Figure 2:
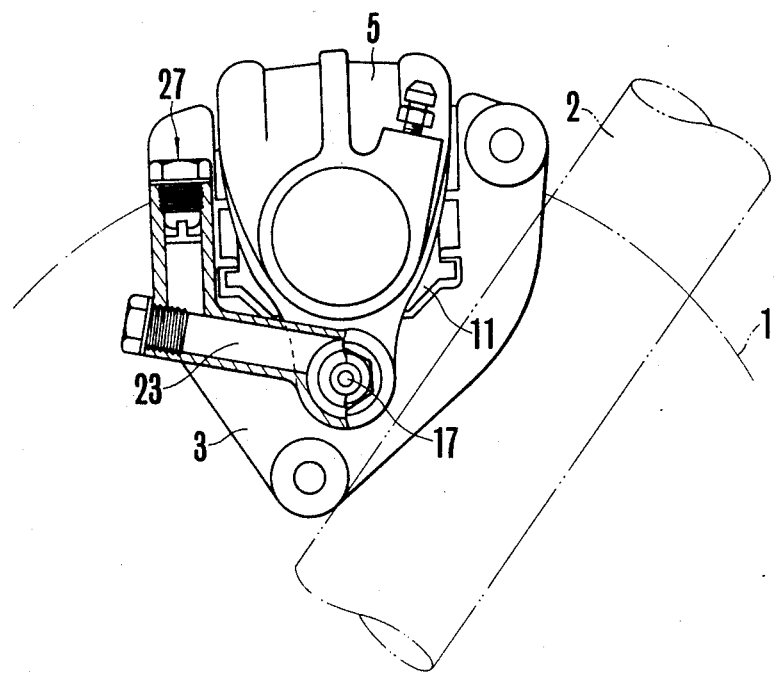
FIG. 2 is a partially sectional side view showing the same embodiment.

As shown in FIG. 2, the reservoir 23 is arranged to extend in the direction parallel to the rotating face of the disc 1 and to be capable of holding a given quantity of hydraulic oil. A numeral 27 indicates an oil supply port provided for oil supply to the reservoir 23.

With the disc brake arranged as described in the foregoing, when the brake cable 17 is pulled in the direction of an arrow shown in FIG. 1, the hydraulic pressure generating piston 15 moves against the force of the spring 14 to cause a decrease in the volume of the hydraulic pressure generating chamber 21. This movement of the piston 15 closes the oil passing port 25 to have a hydraulic pressure developed within the hydraulic pressure generating chamber. The hydraulic pressure is transferred to the hydraulic chamber 10 through the flow paths 20 and 22 and the circumferential groove 19. The hydraulic pressure then causes the thrusting piston 8 to push the friction pad 11 against the disc 1. A reaction force to this then causes the caliper 5 to be guided by the guide pin 4 and to move thereon. This in turn causes the reaction part 9 to push the other friction pad 12 against the disc 1. With the disc 1 being pressed on both sides thereof in this manner, its rotation is braked.

When the brake is released, the spring force of the spring 14 brings the hydraulic pressure generating piston back to the initial position thereof. Then, the reservoir 23 supplies the hydraulic pressure generating chamber 21 with oil through the port 26 and the cup seal 24 and the chamber 21 comes back to the initial condition thereof having zero hydraulic pressure.

FIG. 5 shows a second embodimenet of the invention with the same parts as in the first embodiment indicated by adding 100 to each of the reference numerals used in the illustrations of first embodiment. In the second embodiment, a primary reservoir 123 which is surrounded by a diaphragm made of rubber is formed within a guide pin 104 instead of a support 103. In addition to the primary reservoir 123, a secondary reservoir which is not shown is provided within a caliper 105 for holding a sufficient quantity of oil. For this arrangement, the reservoir 123 within a guide pin 104 is provided with a breathing diaphragm 127. To connect the primary and secondary reservoirs to each other, there are provided a circumferential groove 128 in a caliper 105 and a port 129. With the exception of these parts, the rest of the embodiment are arranged in the same manner as in the preceding embodiment example.

The disc brake incorporating therein the hydraulic pressure generator eliminates the possibility of such brake failures due to damages in hydraulic pressure transfer piping that have been experienced with the conventional disc brakes. The pulling force of the brake cable which is exerted for generating hydraulic pressure in accordance with this invention never causes any troubles for the movement of the caliper.

Further, in accordance with this invention, a better mechanical efficiency can be obtained then that of a brake system in which a thrusting piston is operated by the use of the pulling force of a brake cable through a mechanical link device. Further, compared with the conventional brake system which combines a hydraulically operated disc brake with a master cylinder, the disc brake of the invention can be obtained at a lower cost.

What is claimed is:

1. A disc brake comprising a pair of friction pads disposed on both sides of a disc to be braked to confront each other across the disc, a guide shaft and a caliper which is provided with a thrusting piston disposed therein for pushing one of said friction pads against said disc with hydraulic pressure and is arranged to push the other friction pad against said disc as said caliper is guided on the guide shaft, said disc brake being characterized in that:

said disc brake incorporates a hydraulic pressure generator, said hydraulic pressure generator is disposed within said guide shaft and is provided with a cylinder which is formed within said guide shaft, a hydraulic pressure generating piston which slidably engages said cylinder, and a hydraulic pressure generating chamber; said hydraulic pressure generating chamber communicates, through a passage means, with a hydraulic operation chamber which exerts hydraulic pressure on the thrusting piston; and said hydraulic pressure generating piston is operated by an external force to raise hydraulic pressure within said hydraulic pressure generating chamber for performing a braking action by driving said thrusting piston with said hydraulic pressure.

2. A disc brake according to claim 1, wherein said guide shaft is fixedly secured to a structural part of a vehicle and extends in the axial direction of said disc; and said caliper is arranged to be slidable on said guide shaft in the axial direction of said disc.

3. A disc brake according to claim 2 which further comprises an oil reservoir made of an elastic material and provided so as to surround an outer circumference of the cylinder, said oil reservoir being designed to communicate with the hydraulic pressure generating chamber through the port provided at the oil reservoir.

4. A disc brake according to claim 2, wherein an oil reservoir is formed by an elastic material which is arranged to surround the outer circumference of said cylinder; and said oil reservoir communicates with said hydraulic pressure generating chamber through a port provided in said cylinder.

5. A disc brake according to claim 3, in which the oil reservoir is formed by a cylindrical wall.

* * * * *